United States Patent [19]
Fukui

[11] Patent Number: 5,699,604
[45] Date of Patent: *Dec. 23, 1997

[54] SYSTEM FOR PRODUCING GUIDE RAIL

[75] Inventor: Kiyozumi Fukui, Tokyo, Japan

[73] Assignee: Teijin Seiki Co., Ltd., Osaka, Japan

[*] Notice: The portion of the term of this patent subsequent to Mar. 24, 2015, has been disclaimed.

[21] Appl. No.: 605,667

[22] Filed: Feb. 22, 1996

Related U.S. Application Data

[63] Continuation of Ser. No. 410,331, Mar. 24, 1995, Pat. No. 5,582,068.

[30] Foreign Application Priority Data

Apr. 6, 1994 [JP] Japan ................... 6-68233

[51] Int. Cl.$^6$ ............................................. B23P 23/00
[52] U.S. Cl. ................. 29/564; 29/898.03; 409/132; 409/158
[58] Field of Search ................. 29/564, 563, 898.03, 29/898.1, 558, 33 P, 33 R; 409/131, 132, 167, 158; 483/1; 451/11

[56] References Cited

U.S. PATENT DOCUMENTS

| | | | |
|---|---|---|---|
| 5,250,126 | 10/1993 | Ohya et al. | 29/898.03 |
| 5,368,539 | 11/1994 | Mills et al. | 483/1 |
| 5,373,635 | 12/1994 | Nowaka et al. | 29/898.1 |
| 5,567,195 | 10/1996 | Tufts et al. | 451/11 |

*Primary Examiner*—William Briggs
*Attorney, Agent, or Firm*—Lane, Aitken & McCann

[57] ABSTRACT

A motion transforming mechanism comprises a plate assembly constituted by rotation plates having a common rotation axis, a toothed rail having a parallel rail portion and a mid-longitudinal plane perpendicularly intersected by the common rotation axis and held in mesh with the rotation plates, a housing for housing the plate assembly and the toothed rail, and a rotation shaft supported by the housing and formed with cranked shaft portions respectively received in the rotation plates. The motion transforming mechanism further comprises distance regulating means for regulating the distance between the common rotation axis and the toothed rail. The toothed rail is formed with a toothed portion having a pitch plane perpendicularly intersected by the mid-longitudinal plane and a base portion integrally formed with the toothed portion and having a parallel rail portion in parallel with the mid-longitudinal plane and the pitch plane of the toothed rail.

10 Claims, 9 Drawing Sheets

SYSTEM FOR PRODUCING GUIDE RAIL

This is a continuation of application Ser. No. 08/410,331 of Kiyozumi Fukui, filed on Mar. 24, 1995, for Motion Transforming Mechanism and System for Producing Same U.S. Pat. No. 5,582,068.

FIELD OF THE INVENTION

The present invention relates to a motion transforming mechanism for transforming a rotational motion, for example, to a straight motion. The present invention is additionally concerned with a process of and a production apparatus for producing the motion transforming mechanism.

DESCRIPTION OF THE PRIOR ART

The motion transforming mechanism of this kind for transforming the rotation motion to the straight motion is utilized as a fundamental mechanical structure in a wide range of mechanical fields and for example is represented by a so-called rack-and-pinion structure consisting of a rack and a pinion held in mesh with each other. The rack-and-pinion structure is so constructed that the rotational motion of the pinion is transformed to the straight motion of the rack by way of a small number, for instance, "1" or "2" of teeth of the rack and the pinion meshing with one another. As a consequence, the rack and the pinion are inevitably required to become large in width in order to obtain a large thrust force for moving the rack with respect to the pinion. This results in such a drawback that the rack-and-pinion structure cannot avoid to become large in size. In addition, the pinion is designed to be driven and reduced in revolutions by a reduction gear, thereby making disadvantageous in the aspect of the size of the motion transforming mechanism resulting from the large size of the motion transforming mechanism.

Figure 14:
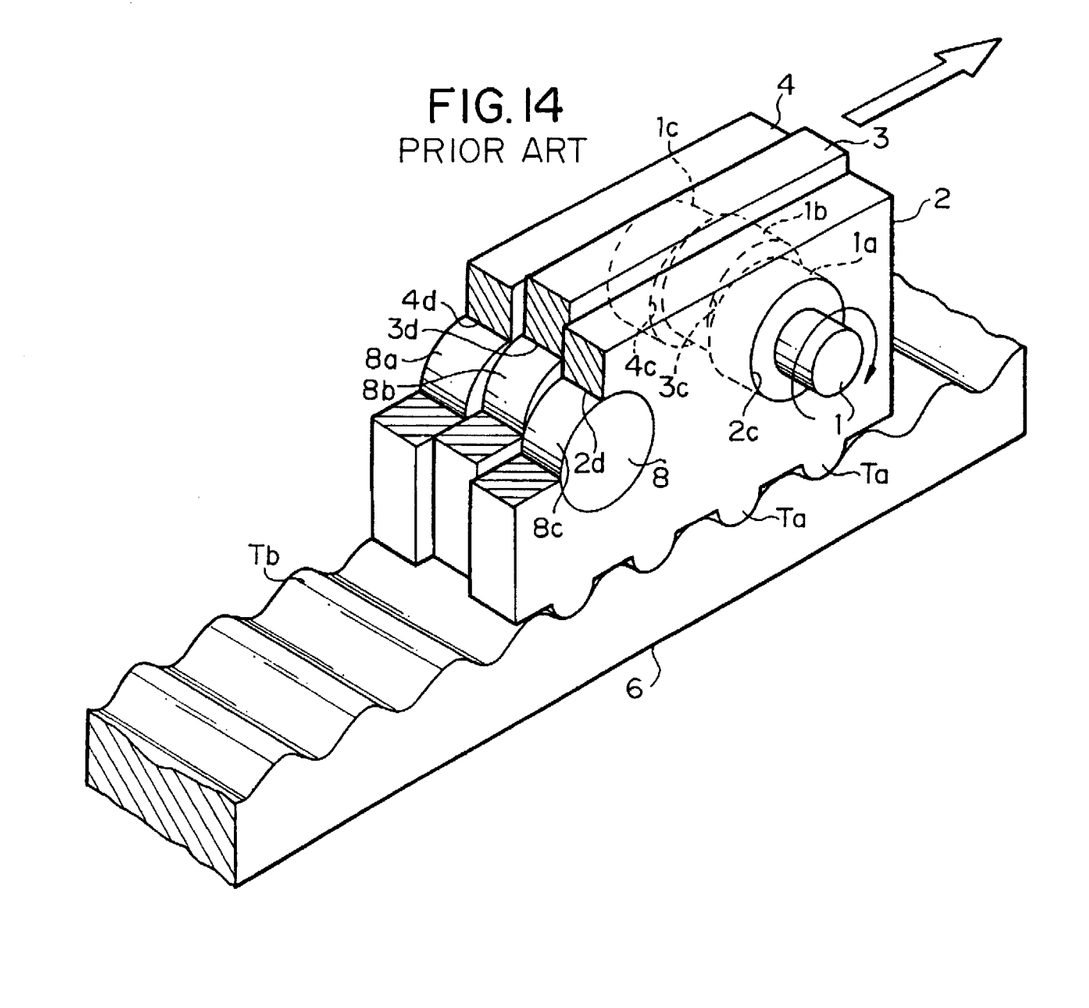
FIG. 14 is a perspective view, partly cross-sectioned, similar to FIG. 7 but showing a conventional motion transforming mechanism.

In view of the foregoing drawback, there has so far been proposed by the present applicant a prior-art motion transforming mechanism disclosed in Japanese Patent Laid-open Publication No. 4-160258 and shown in FIG. 14. FIG. 14 is a fragmentary schematic view showing an outline construction of the prior-art motion transforming mechanism. In FIG. 14, the motion transforming mechanism comprises a first rotation shaft 1 driven by an electric motor not shown, three rotation plates 2 to 4 each formed with a plurality of teeth Ta, and rotatably supported by the first rotation shaft 1, a toothed straight rail 6 formed with a plurality of teeth Tb held in mesh with the teeth Ta of the rotation plates 2 to 4 and a second rotation shaft 8 rotatably supporting the rotation plates 2 to 4 in cooperation with the first rotation shaft 1. The teeth Ta of the rotation plates 2 to 4 are in the form of semicircular shape, while the teeth Tb of the toothed straight rail 6 are in the form of wave shape.

The first rotation shaft 1 is formed with three cranked shaft portions 1a to 1c having respective eccentric axes displaced from and arranged equi-angularly around the center axis of the first rotation shaft 1 so that the cranked shaft portions 1a to 1c are angularly displaced at 120 degrees of phase difference. The second rotation shaft 8 is formed with three cranked shaft portions 8a to 8c similar to those of the first rotation shaft 1. The rotation plates 2 to 4 have first cranked through bores 2c, 3c and 4c and second cranked through bores 2d, 3d and 4d which rotatably receive the cranked shaft portions 1a to 1c and 8a to 8c, respectively, and are accordingly rotated with respect to the center axis of the first rotation shaft 1 with 120 degrees of phase difference by the rotation of the first rotation shaft 1.

The rotation plates 2 to 4 are provided with 120 degrees of phase difference angularly displaced to one another by means of the first and second cranked shaft portions 1a, 1b and 1c and 8a, 8b and 8c. This means that the rotation plates 3 and 4 are advanced at 120 and 240 degrees with respect to the rotation plate 2 when the rotation plate 2 is located at its predetermined position on the toothed rail 6. In other words, the teeth Ta of the rotation plates 2 to 4 come to be held in meshing engagement with the teeth Tb of the toothed straight rail 8 at a displaced angle of 120 degrees if the teeth Tb of the toothed straight rail 6 have one pitch of 360 degrees.

When the teeth Ta of one of rotation plates 2 to 4 are maintained in engagement with the ascending inclination surfaces of the teeth Tb, the teeth Ta of at least one of the remaining two rotation plates are held in mesh with the descending inclination surfaces of the teeth Tb. Accordingly, the teeth Ta of at least one of the rotation plates 2 to 4 are inevitably held in engagement with the descending inclination surfaces of the teeth Tb of the toothed straight rail 6 during one revolution of the input shaft 1 so that the one of rotation plates 2 to 4 can procure a thrust force needed for forcing the toothed straight rail 6 to be pushed depending upon the width and the number of the teeth of the rotation plate, thereby making it possible to realize a powerful intensive motion transforming mechanism for its small size.

A following drawback is, however, still encountered in such an advanced version of the prior-art transforming mechanism.

In order to relatively move the rotation plates with respect to the toothed straight rail, the toothed straight rail is securely mounted on a certain stationary member exemplified by a linear bearing rail. The linear bearing rail is usually formed with a straight groove to receive the toothed straight rail for purpose of providing smooth relative movement of the rotation plates and the toothed straight rail. It is, however, extremely difficult for the straight groove to be formed in the linear bearing rail without errors and with an accuracy required for the smooth relative movement of the rotation plates and the toothed straight rail. Moreover, other machining errors are likely caused on the contacting surfaces of mechanical parts including the toothed straight rail, the teeth of the rotation plates, and the cracked shaft portions of the rotation shaft. This results in the fact that the motion transforming mechanism is subject to vibration, noise, and clattering sound resulting from being prevented from being smoothly operated.

The present invention contemplates provision of an improved motion transforming mechanism overcoming the drawback of the above prior-art motion transforming mechanism of the described general natures.

It is, therefore, an object of the present invention to provide a motion transforming apparatus which is produced without such machining errors and can provide smooth relative motion of the rotation plates and the toothed straight rail.

It is another object of the present invention to provide a process of and a system for producing a motion transforming apparatus which does not cause such machining errors and can provide smooth relative motion of the rotation plates and the toothed straight rail.

SUMMARY OF THE INVENTION

According to one aspect of the present invention, there is provided a motion transforming mechanism, comprising; a plate assembly constituted by a plurality of rotation plates having common rotation axis and having respective rack portions each formed with a plurality of teeth, the rotation plates being laterally juxtaposed with the rack portions of the rotation plates adjacent to one another, the rotation plates being respectively formed with cranked through bores having respective center axes in parallel relationship to one another and to the common rotation axis, and the center axes of the cranked through bores being displaced from and arranged equi-angularly around the common rotation axis of the rotation plates; a toothed rail having a mid-longitudinal plane perpendicularly intersected by the common rotation axis of the rotation plates and formed with a plurality of teeth held in mesh with the teeth of each of rotation plates of the plate assembly, the toothed rail having an addendum plane, a dedendum plane and a pitch plane spaced at a constant distance from the addendum and dedendum planes; a housing for housing the plate assembly and the toothed rail; a rotation shaft rotatably supported by the housing and having a center axis perpendicularly intersecting the mid-longitudinal plane of the toothed rail and parallel with the common rotation axis of the rotation plates, the rotation shaft being formed with cranked shaft portions having respective eccentric axes in parallel relationship to one another and respectively received in the cracked thorough bores; and distance regulating means for regulating the distance between the common rotation axis of the rotation plates and the pitch plane of the toothed rail by relatively moving the toothed rail and the housing with respect to each other along the mid-longitudinal plane and the pitch plane of the toothed rail to ensure the toothed rail and the housing to relatively smoothly move with respect to each other.

According to further aspect of the present invention, there is provided a process of producing a motion transforming mechanism, comprising: a plate assembly constituted by a plurality of rotation plates having common rotation axis and having respective rack portions each formed with a plurality of teeth, the rotation plates being laterally juxtaposed with the rack portions of the rotation plates adjacent to one another, the rotation plates being respectively formed with cranked through bores having respective center axes in parallel relationship to one another and to the common rotation axis, and the center axes of the cranked through bores being displaced from and arranged equi-angularly around the common rotation axis of the rotation plates; a toothed rail having a mid-longitudinal plane perpendicularly intersected by the common rotation axis of the rotation plates and formed with a plurality of teeth held in mesh with the teeth of each of rotation plates of the plate assembly, the toothed rail having an addendum plane, a dedendum plane and a pitch plane spaced at a constant distance from the addendum and dedendum planes; a housing for housing the plate assembly and the toothed rail; a rotation shaft rotatably supported by the housing and having a center axis perpendicularly intersecting the mid-longitudinal plane of the toothed rail and parallel with the common rotation axis of the rotation plates, the rotation shaft being formed with cranked shaft portions having respective eccentric axes in parallel relationship to one another and respectively received in the cracked thorough bores; and distance regulating means for regulating the distance between the common rotation axis of the rotation plates and the pitch plane of the toothed rail by relatively moving the toothed rail and the housing with respect to each other along the mid-longitudinal plane and the pitch plane of the toothed rail to ensure the toothed rail and the housing to relatively smoothly move with respect to each other, the toothed rail having both side face portions across the mid-longitudinal plane of the toothed rail portion and each formed with a parallel rail portion having a center axis extending in parallel with the mid-longitudinal plane and the pitch plane of the toothed rail, and the housing having both inner side face portions in opposing and spaced relationship with the both the face portions of the toothed rail and each formed with a parallel housing groove having a center axis in parallel with the center axis of the parallel rail portion of the toothed rail and in opposing and spaced relationship with the parallel rail portion, each of the parallel housing grooves being formed to have closed longitudinal ends, and the distance regulating means comprising a plurality of guide rollers received in the parallel rail portions of the toothed rail and the parallel housing groove and movable between the closed longitudinal ends of the parallel housing groove to ensure the toothed rail and the housing to relatively smoothly move with respect to each other, comprising the steps of: preparing a machining material to be machined into the toothed rail, and machining the machining material to alternatively machine the teeth of the toothed rail and the parallel rail portion of the toothed rail.

According to yet further aspect of the present invention, there is provided a motion transforming mechanism, production apparatus for producing a motion transforming mechanism, comprising: a plate assembly constituted by a plurality of rotation plates having a common rotation axis and having respective rack portions each formed with a plurality of teeth, the rotation plates being laterally juxtaposed with the rack portions of the rotation plates adjacent to one another, the rotation plates being respectively formed with cranked through bores having respective center axes in parallel relationship to one another and to the common rotation axis, and the center axes of the cranked through bores being displaced from and arranged equi-angularly around the common rotation axis of the rotation plates; a toothed rail having a mid-longitudinal plane perpendicularly intersected by the common rotation axis of the rotation plates and formed with a plurality of teeth held in mesh with the teeth of each of rotation plates of the plate assembly, the toothed rail having an addendum plane, a dedendum plane and a pitch plane spaced at a constant distance from the addendum and dedendum planes; a housing for housing the plate assembly and the toothed rail; a rotation shaft rotatably supported by the housing and having a center axis perpendicularly intersecting the mid-longitudinal plane of the toothed rail and parallel with the common axis of the rotation plates, the rotation shaft being formed with cranked shaft portions having respective eccentric axes in parallel relationship to one another and respectively received in the cracked thorough bores; and distance regulating means for regulating the distance between the common rotation axis of the rotation plates and the pitch plane of the toothed rail by relatively moving the toothed rail and the housing with respect to each other along the mid-longitudinal plane and the pitch plane of the toothed rail to ensure the toothed rail and the housing to relatively smoothly move with respect to each other, the toothed rail having both side face portions across the mid-longitudinal plane of the toothed rail portion and each formed with a parallel rail portion having a center axis extending in parallel with the mid-longitudinal plane and the pitch plane of the toothed rail, and the housing having both inner side face portions in opposing and spaced relationship with the both the face portions of the toothed rail and each formed with a parallel housing groove having a center axis in parallel with the center axis of the parallel rail portion of the toothed rail and in opposing and spaced relationship with the parallel rail portion, each of the parallel housing grooves being formed to have closed longitudinal ends, and the distance regulating means comprising a plurality of guide rollers received in the parallel rail portions of the toothed rail and the parallel housing groove and movable between the closed longitudinal ends of the parallel housing groove to ensure the toothed rail and the housing to relatively smoothly move with respect to each other, comprising: supporting means for supporting a machining material to be machined into the toothed rail to allow the machining material only to move in its longitudinal direction, transferring means for transferring the machining material at a predetermined movement speed in its longitudinal direction and stopping the machining material at a predetermined time interval after the machining material is transferred at a predetermined movement pitch, a first machining unit having a first tool for machining the teeth of the toothed rail, and a pair of second machining units each having a second tool for machining the parallel rail portion of the toothed rail, whereby the machining material are alternatively machined by the first and second machining tool to form the teeth of the toothed rail and the parallel rail portion of the toothed raft while the machining material is being transferred by the transferring means and supported by the supporting means.

BRIEF DESCRIPTION OF THE DRAWINGS

The features and advantages of a motion transforming mechanism in accordance with the present invention will be more clearly understood from the following description taken in conjunction with the accompanying drawings in which.

DESCRIPTION OF THE PREFERRED EMBODIMENTS

Referring to FIGS. 1 to 9 of the drawings, a first preferred embodiment of a motion transforming mechanism embodying the present invention is shown as comprising a plate assembly 10 (See FIGS. 2 to 4) constituted by a plurality of rotation plates 11 to 13 which have a common rotation axis C1 and have respective rack portions 11a, 12a and 13a each formed with a plurality of teeth T1. The rotation plates 11 to 13 are laterally juxtaposed with the rack portions 11a, 12a and 13a of the rotation plates 11 to 13 adjacent to one another. The rotation plates 11 to 13 are respectively formed with pairs of cranked through bores 11b, 12b and 13b having respective center axes C11, C12 and C13 in parallel relationship to one another and to the common rotation axis C1. The center axes C11 to C13 of the cranked through bores 11b, 12b and 13b of the rotation plates 11 to 13 are displaced from and arranged equi-angularly around the common rotation axis C1 of the rotation plates 11 to 13.

Figure 1:
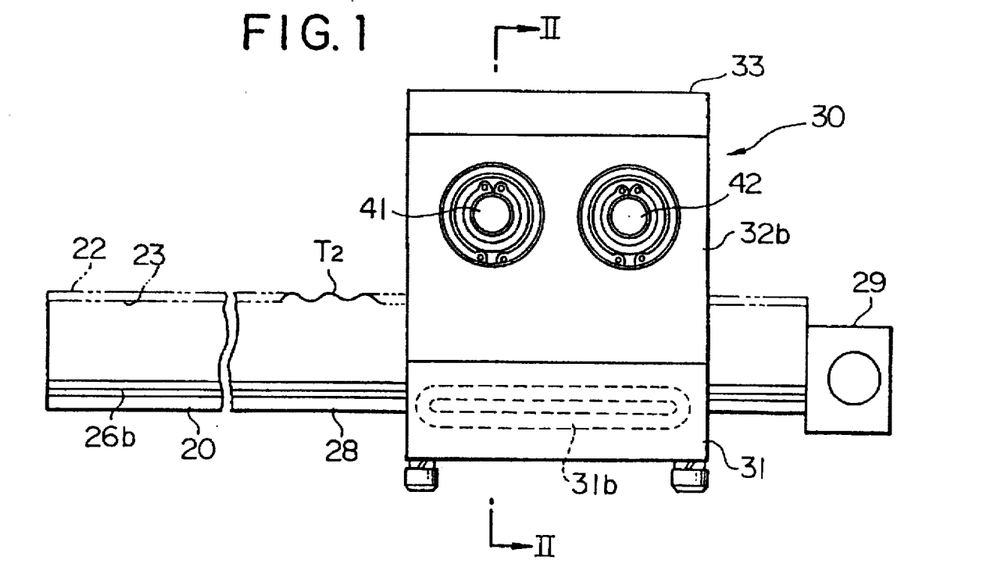
FIG. 1 is a side view of a first embodiment of the motion transforming mechanism according to the present invention.
Figure 2:
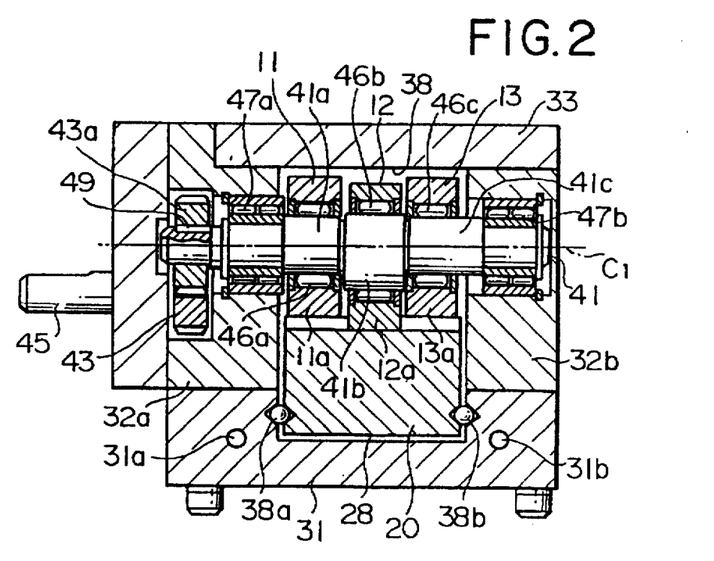
FIG. 2 is a cross-sectional view taken along the line II—II in FIG. 1.
Figure 3:
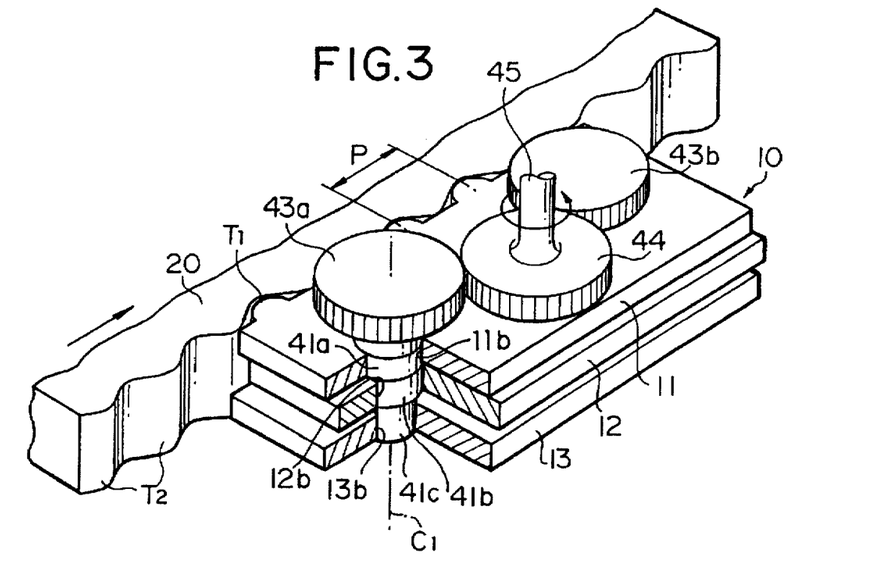
FIG. 3 is a fragmentary perspective view, partly cross-sectioned, of the first embodiment of the motion transforming mechanism according to the present invention.
Figure 4:
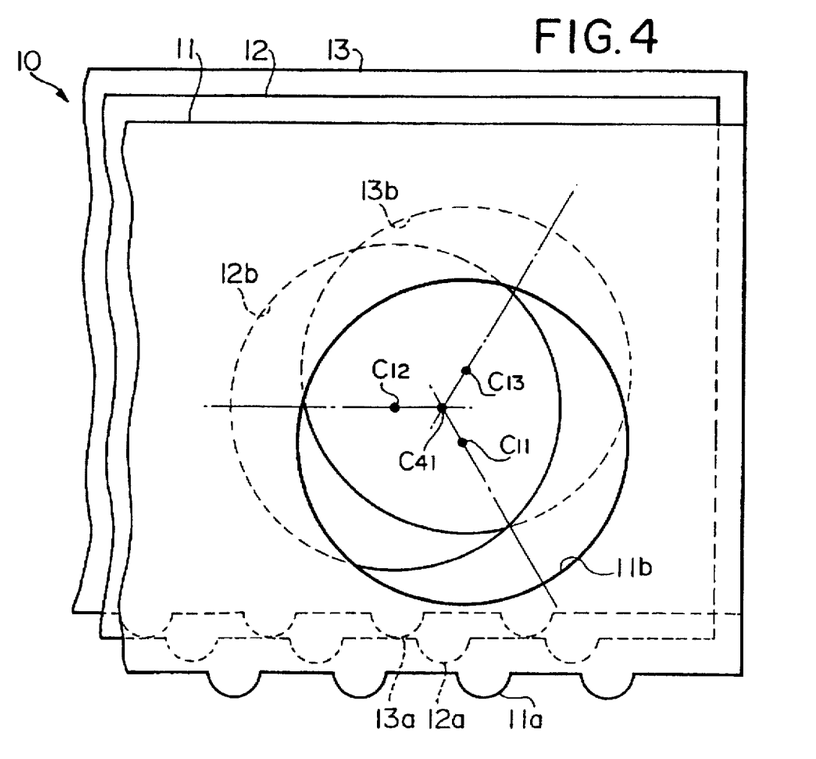
FIG. 4 is a plan view of a plate assembly forming part of the motion transforming mechanism according to the present invention.
Figure 5:
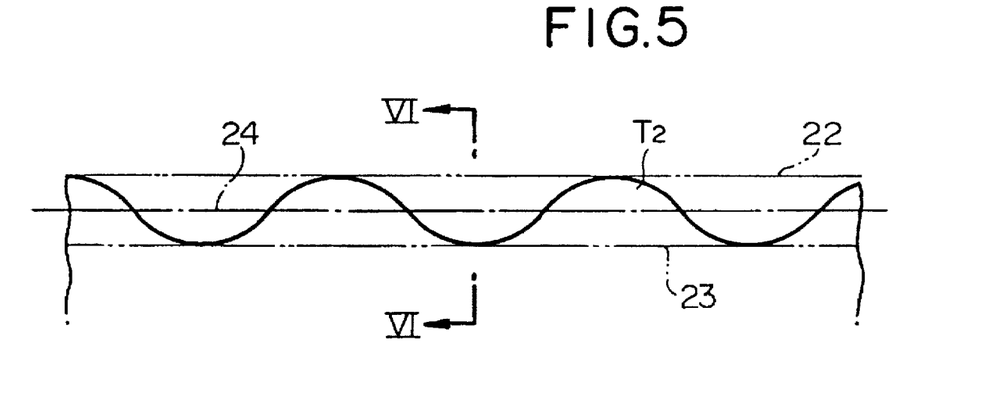
FIG. 5 is a side view schematically showing part of a toothed rail forming part of the motion transforming machine according to the present invention.
Figure 6:
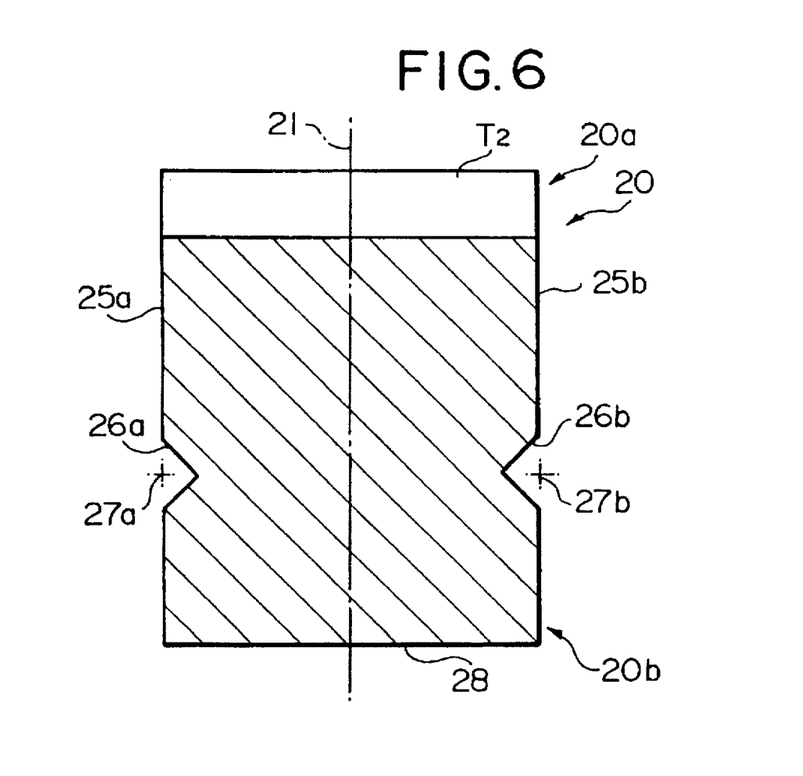
FIG. 6 is a cross-sectional view taken along the line V—V in FIG. 5.

The motion transforming mechanism further comprises a toothed rail 20 having a mid-longitudinal plane 21 perpendicularly intersected by the common rotation axis C1 of the rotation plates 11 to 13. As shown in FIGS. 5 and 6, the toothed rail 20 has a toothed portion 20a formed with a plurality of teeth T2 and a base portion 20b integrally formed with the toothed portion 20a to support the toothed portion 20a. The toothed portion 20a and the base portion 20b are constructed by a single material. The teeth T2 of the toothed rail 20 are held in mesh with the teeth T1 of the rotation plates 11 to 13 of the plate assembly 10 to have the teeth T2 form an addendum plane 22, a dedendum plane 23 and a pitch plane 24 spaced at a constant distance from the addendum and dedendum planes 22 and 23. The toothed rail 20 has both side face portions 25a and 25b across the mid-longitudinal plane 21 of the toothed rail 20 and each formed with a parallel rail groove 26a or 26b. Each of the parallel rail grooves 26a and 26b have a center axis 27a or 27b extending in parallel with the mid-longitudinal plane 21 and the pitch plane 24 of the toothed rail 20. The toothed rail 20 may be mounted at its lower end coupler position 28 on a certain stationary member not shown in the drawing.

The motion transforming mechanism further comprises a housing 30 for housing the plate assembly 10 and the toothed rail 20. The housing 30 comprises a housing base portion 31, a pairs of side wall portions 32a, 32b positioned on the housing base portion 31 and in opposing and spaced relationship with each other, and a cover portion 33 positioned on the side wall portions 32a and 32b and in opposing and spaced relationship with the housing base portion 31. The housing base portion 31, side wall portions 32a and 32b and cover portion 33 are securely connected with one another to form a chamber 38 accommodating therein the toothed rail 20 and the plate assembly 10.

The motion transforming mechanism further comprises a plurality of rotation shaft 41 and 42 rotatably supported by the housing 30 through a plurality of bearings 47a and 47b and each having a center axis C41 or C42 perpendicularly intersecting the mid-longitu-dinal plane 21 of the toothed rail 20 and parallel with the common axis C1 of the rotation plates 11 to 13. The rotation shaft 41 is formed with cranked shaft portions 41a, 41b and 41c having respective eccentric axes C11, C12 and C13 in parallel relationship to one another and respectively received in the cracked thorough bores 11b, 12b and 13b through a plurality of roller bearings 46a, 46b and 46c. The rotation shaft 42 is formed with cranked shaft portions same as the cranked shaft portions 41a, 41b and 41c having respective eccentric axes in parallel relationship to one another to be received in the cracked thorough bores 11b, 12b and 13b through a plurality of roller bearings 46a, 46b and 46c. The reference numerals 43a, 43b designate a pair of gears respectively connected to the rotation shafts 41 and 42 through known key members 49 to be held in mesh with an input gear 44. The input gear 44 is in parallel with the rotation shafts 41 and 42 connected to an input shaft 45 rotatably supported by the housing 30 and driven by an electric motor to rotate the rotation shafts 41 and 42 through the gears 43a and 43b.

The motion transforming mechanism further comprises distance regulating means for regulating the distance between the common rotation axis C1 of the rotation plates 11 to 13 and the pitch plane 24 of the toothed rail 20 by relatively moving the toothed rail 20 and the housing 30 with respect to each other along the mid-longitudinal plane 21 and the pitch plane 24 of the toothed rail 20 to ensure the toothed rail 20 and the housing 30 to relatively smoothly move with respect to each other. In other words, the distance regulating means is partly constituted by the toothed rail 20 and the housing 30. The housing 30 has both inner side face portions 35a and 35b in opposing and spaced relationship with the both side face portions 25a and 25b of the toothed rail 20 and each formed with a parallel housing groove 36a or 36b. The parallel housing grooves 36a and 36b of the housing 30 have center axes 37a and 37b respectively in parallel with the center axis 27a and 27b of the parallel rail grooves 26a and 26b of the toothed rail 20 and in opposing and spaced relationship with the parallel rail grooves 26a and 26b.

Figure 7:
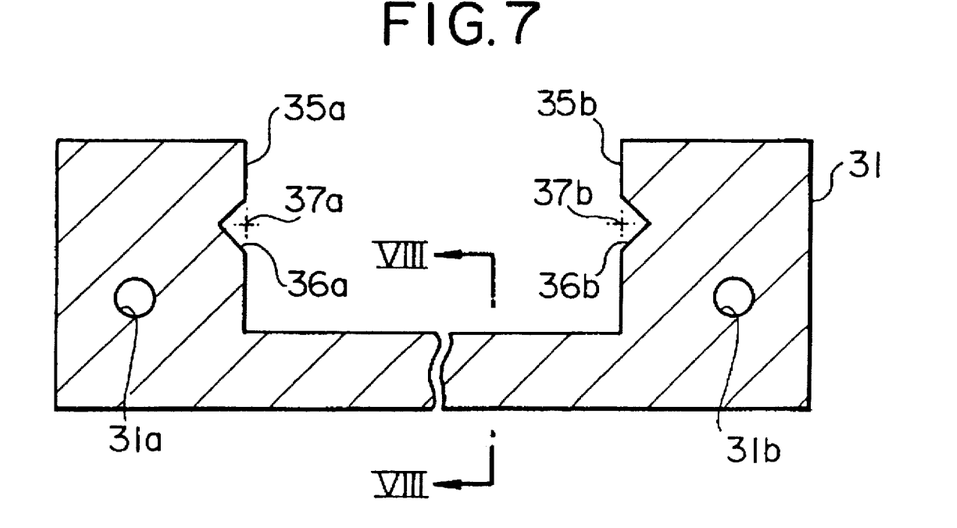
FIG. 7 is a cross-sectional view showing part of a housing forming part of the motion transforming machine according to the present invention.
Figure 8:
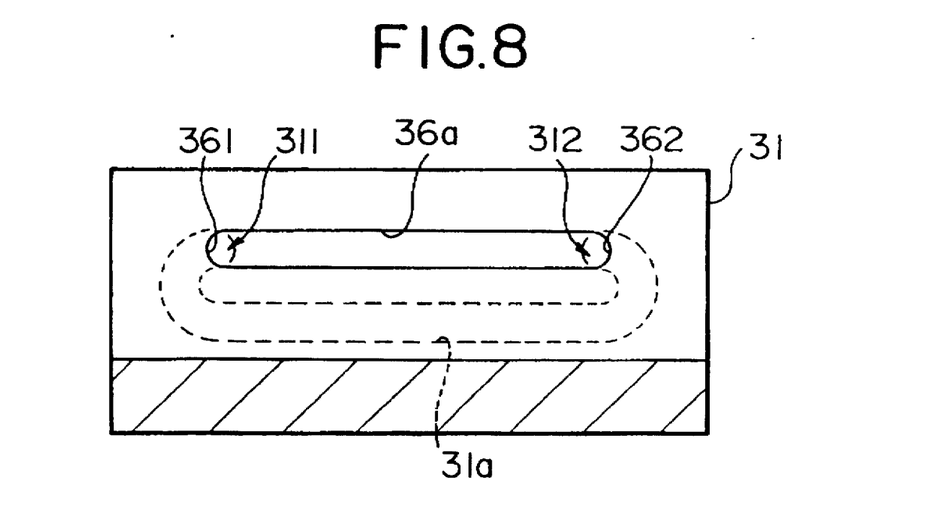
FIG. 8 is a sectional view taken along the line VII—VII in FIG. 3.

As shown in FIGS. 7 and 8, each of the parallel housing grooves 36a and 36b is formed to have closed longitudinal ends 361, 362. The distance regulating means comprises a plurality of guide rollers 38a and 38b received in the parallel rail grooves 26a and 26b of the toothed rail 20 and the parallel housing grooves 36a and 36b, and movable between the closed longitudinal ends 361, 382 of the parallel housing grooves 36a and 36b to ensure the toothed rail 20 and the housing 30 to relatively smoothly move with respect to each other. Additionally, the side portions 35a and 35b of the housing 30 are respectively formed with embedded housing holes 31a and 31b extending along the parallel housing grooves 36a and 36b and having opened longitudinal ends 311 and 312. The longitudinal ends 311 and 312 of the parallel housing grooves 36a and 38b are respectively connected to the closed longitudinal ends 361 and 362 of the parallel housing grooves 36a and 36b to allow the guide rollers 38a and 38b to circulate in the embedded housing holes 31a and 31b of the housing base portion 31 of the housing 30 through the closed longitudinal ends 361, 362 of the parallel housing groove 36a and 36b and the opened longitudinal ends 311 and 312 of the embedded housing holes 31a and 31b of the housing 30. The parallel rail grooves 26a and 26b of the toothed rail 20 and the parallel housing grooves 36a and 36b of the housing 30 are open toward each other and each has a triangular shape in cross-section sectioned perpendicularly to the mid-longitudinal plane 21 and the pitch plane 24 of the toothed rail 20.

Figure 9A:
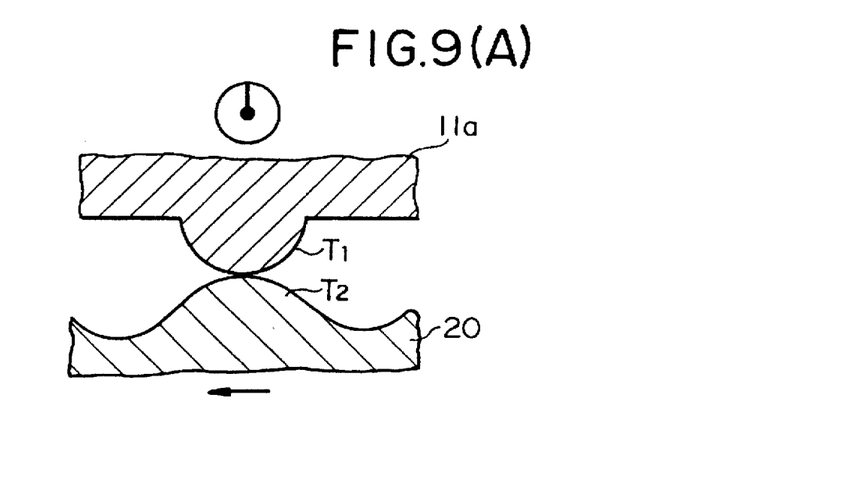
FIGS. 9(A) to 9(C) are fragmentary cross-sectioned views to be used for explaining motion of the toothed rail and rotation plates of the motion transforming machine according to the present invention.
Figure 9B:
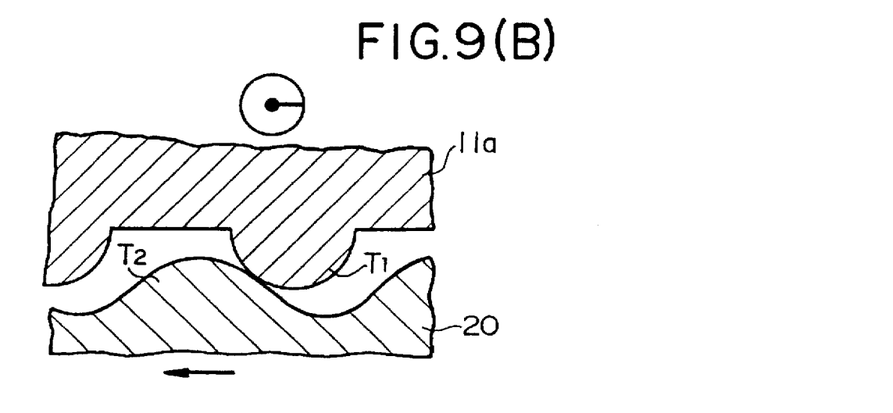
Figure 9C:
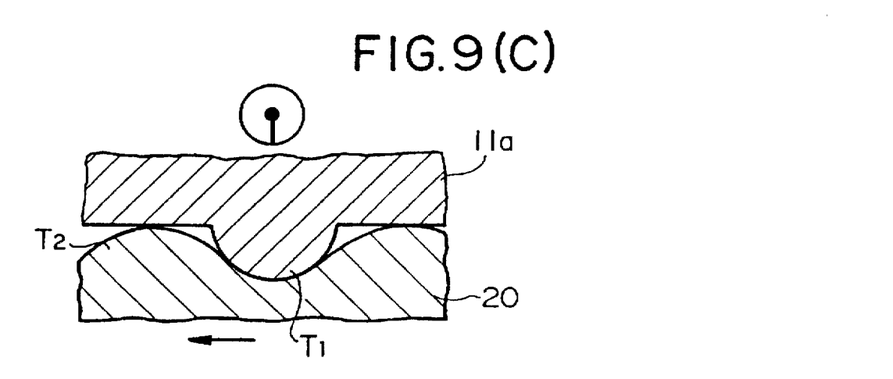

FIGS. 9(A), 9(B) and 9(C) show three different rotation angle stages which include a first rotation angle stage where the teeth T1 of each of the rack portions 11a, 12a and 13a are held in contact with pinnacle portions of the teeth T2 of the toothed rail 20 at a crank angle of zero degree, a second rotation angle stage where the teeth T1 of each of the rack portions 11a, 12a and 13a of the rotation plates 11, 12 and 13 are held in contact with shoulder portions of the teeth T2 of the toothed rail 20 at a crank angle of 90 degrees, and a third rotation angle stage where the teeth T1 of each of the rack portions 11a, 12a and 13a are held in contact with bottom portions of the teeth T2 of the toothed rail 20 at a crank angle of 180 degrees. The rotation plates 11 to 13 are provided with 120 degrees of phase difference angularly displaced to one another by means of the cranked shaft portions 41a, 41b and 41c. This means the fact that the rotation plates 12 and 13 are advanced at 120 and 240 degrees with respect to the rotation plate 11 when the rotation plate 11 is located at its predetermined position on the toothed rail 20. In other words, the teeth T1 of the rotation plates 11 to 13 come to be held in meshing engagement with the teeth T2 of the toothed rail 20 at a displaced angle of 120 degrees if the teeth T2 of the toothed rail 20 have one pitch P (See FIG. 3) of 360 degrees.

Figure 10:
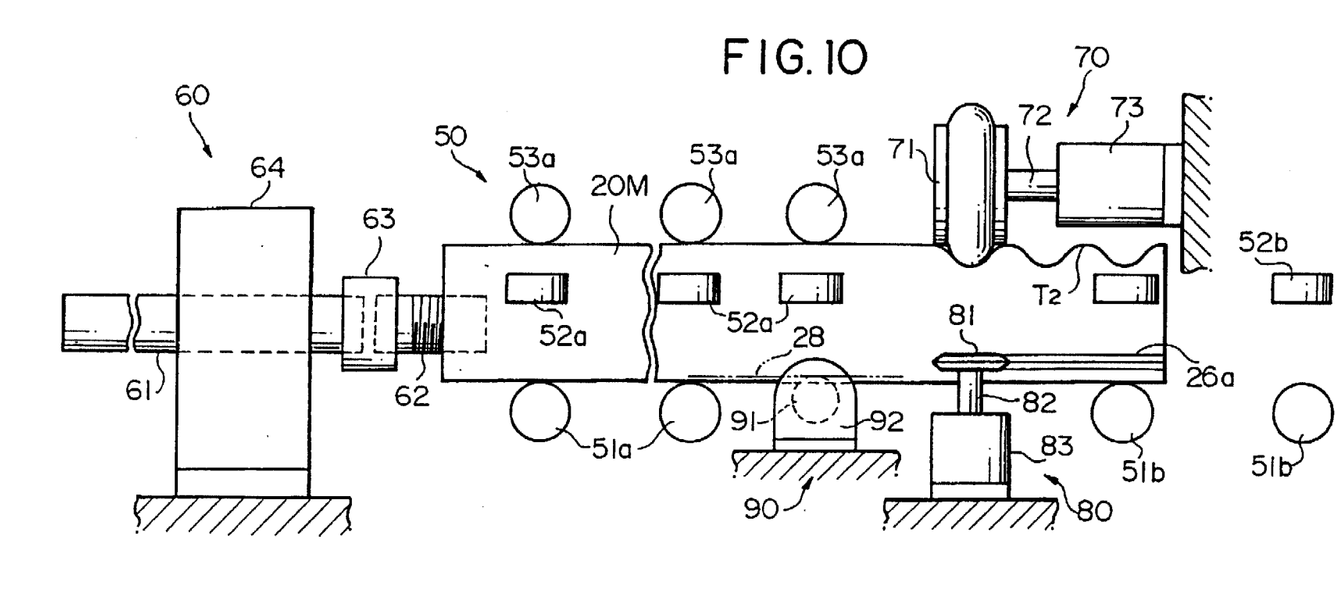
FIG. 10 is a side view of a production apparatus for producing the toothed rail in a way to machine the teeth of the toothed rail and the parallel rail portions of the toothed rail.

The toothed rail of the previously mentioned motion transforming mechanism is produced by a production apparatus shown in FIG. 10.

The production apparatus herein shown comprises supporting means 50 for supporting a machining material 20M of the toothed rail 20 to be machined into the toothed rail 20 to allow the machining material 20M of the toothed rail 20 only to move in its longitudinal direction. The supporting means 50 is constituted by a plurality of first supporting rollers 51a, 52a and 53a and second supporting rollers 51b and 52b. Each of the rollers 51a, 51b, 52a, 52b and 53a is rotatably supported by a main body forming part of the production apparatus but not shown in any drawings. The first and second supporting rollers 51a, 51b, 52a, 52b and 53 are positioned on the upper surface and the lower surface of the machining material 20M of the toothed rail 20 as well as on the side surfaces of the machining material 20M of the toothed rail 20. The supporting rollers 51a, 51b, 52a, 52b and 53a are spaced apart from one another in the longitudinal direction of the machining material 20M of the toothed rail 20 to support and retain the machining material 20M of the toothed rail 20 at its precise position while preventing the machining material 20M of the toothed rail 20 from being moved away from its position while the machining material 20M of the toothed rail 20 is being machined by machining tools 71, 81 and 91 which will become apparent as the description proceeds with respect to the present invention. The supporting rollers 51a, 51b, 52a, 52b and 53a are designed to be movable toward and away from an operable position where the machining material 20M of the toothed rail 20 is machined by a first tool which will also become apparent as the description proceeds with respect to the present invention. The supporting rollers 51a, 51b, 52a, 52b and 53a can assume an inoperable position where the machining material of the toothed rail 20 is not machined by the first tool.

The production apparatus further comprises transferring means 60 for transferring the machining material 20M of the toothed rail 20 at a predetermined movement speed in its longitudinal direction and stopping the machining material 20M of the toothed rail 20 at a predetermined time interval after the machining material 20M of the toothed rail 20 is transferred at a predetermined movement pitch. The transferring means 60 comprises a connecting rod 61, a screw member 62 having one end portion tightly coupled with the connecting rod 61 through a coupling 63 and the other end portion screwed to the longitudinal end portion of the machining material 20M of the toothed rail 20, and a transferring mechanism 64 drivably connected with the connecting rod 61 and shifting the screw member 62 to transfer the machining material 20M of the toothed rail 20 at a predetermined movement speed in its longitudinal direction and stopping the machining material 20M of the toothed rail 20 at a predetermined time interval after the machining material 20M of the toothed rail 20 is transferred at a predetermined movement pitch.

The production apparatus further comprises a first machining unit 70 having a first tool 71 for machining the teeth T2 of the toothed rail 20, a rotation shaft 72 securely connected to the first tool 71, and an electric motor 73 for rotating the first tool 71 through the rotation shaft 72. The first tool 71 is formed into a disc-like shape and positioned with respect to the machining material 20M of the toothed rail 20 to have the machining material 20M of the toothed rail 20 cut at a predetermined depth. The rotation of the electric motor 73 causes the machining material 20M of the toothed rail 20 to be machined by the first tool 71 while being retained by the supporting rollers 51a, 51b, 52a, 52b and 53a of the supporting means 50. The first tool 71 and the electric motor 73 are designed to be movable toward and away from an operable position where the machining material 20M of the toothed rail 20 is machined by the first tool 71. Each of the first tool 71 and the electric motor 73 can assume an inoperable position where the machining material 20M of the toothed rail 20 is not machined by the first tool 71.

The production apparatus further comprises a second machining unit 80 having a pair of second tools 81 for machining the parallel rail grooves 26a and 26b to form parallel rail portions of the toothed rail 20, a pair of rotation shafts 82 each securely connected to each of the second tools 81, and a pair of electric motors 83 for rotating the respective second tools 81 through the respective rotation shafts 82. The second tools 81 are each formed into a disc like shape and positioned with respect to the machining material 20M of the toothed rail 20 to from the parallel rail portion of the toothed rail 20 such as the triangle cross-sectioned rail groove 26a or 26b in each side of the machining material 20M of the toothed rail 20 at a predetermined depth. The rotation of each of the electric motors 83 causes the machining material 20M of the toothed rail 20 to be machined by the second tools 81 while being retained by the supporting rollers 51a, 51b, 52a, 52b and 53a of the supporting means 50. Each of the second tools 81 and the electric motor 83 is designed to be movable toward and away from an operable position where the machining material 20M of the toothed rail 20 is machined by the second tools 81, and can assume an inoperable position where the machining material 20M of the toothed rail 20 is not machined by the second tools 81.

The production apparatus further comprises a third machining unit 90 having a third tool 91 for machining the lower end coupler portion 28 of the toothed rail 20 and an electric motor 92 for rotating the third tool 91 through its output shaft not shown in the drawing. The third tool 91 is formed into a disc-like shape and positioned with respect to the machining material 20M of the toothed rail 20 to have the machining material 20M of the toothed rail 20 cut at a predetermined depth. The rotation of the electric motor 92 causes the machining material 20M of the toothed rail 20 to be machined by the third tool 91 while being supported by the supporting rollers 51a, 51b, 52a, 52b and 53a of the supporting means 50. Each of the third tool 91 and the electric motor 92 is designed to be movable toward and away from an operable position where the machining material 20M of the toothed rail 20 is machined by the third tool 91. The third tool 91 and the electric motor 92 can assume an inoperable position where the machining material 20M of the toothed rail 20 is not machined by the third tool 91.

The first, second and third machining units 70, 80 and 90 are arranged with respect to one another and with respect to the position where the machining material 20M of the toothed rail 20 assumes to be machined by the first, second and third machining units 70, 80 and 90. These machining units 70, 80 and 90 can thus be operated to move their respective operable positions where the first, second and third tools 71, 81 and 91 are held in contact with the machining material 20M of the toothed rail 20 to machine the teeth T2, the parallel rail portion 26a and 26b and the lower end coupler portion 28 of the toothed rail 20.

The toothed rail 20 is neither required to be machined on the respective different remote positions where the teeth T2, the parallel rail portions 26a and 26b and the lower end coupler portion 28 of the toothed rail 20 are separately and independently machined nor required to be removed several times out of the production apparatus for machining the teeth T2, the parallel rail portions 26a and 26b and the lower end coupler portion 28 of the toothed rail 20. This makes it possible to save wasteful times needed for machining the teeth T2, the parallel rail portions 26a and 26b and the lower end coupler portion 28 of the toothed rail 20. The toothed rail 20 is therefore less expensive and produced without machining errors.

Following are a timing for each of the operations of the first, second and third machining units 70, 80 and 90 and a positional relationship between those machining units 70, 80 and 90.

The first machining unit 70 is moved to assume its operable position where the first tool 71 is held in contact with the machining material 20M of the toothed rail 20 to have the teeth T2 of the toothed rail 20 machined by the first machining unit 70 when the second and third machining units 80 and 90 are positioned at their inoperable position where the second and third tools 71, 81 and 91 are held out of contact with the machining material 20M of the toothed rail 20. The second and third machining units 80 and 90 are inversely moved to assume their operable position where the second and third tools 81 and 91 are held in contact with the machining material 20M of the toothed rail 20 when the first machining unit 70 is moved to assume its inoperable position where the first machining unit 70 is held out of contact of machining material 20M of the toothed rail 20. This leads to the fact that the teeth T2 of the toothed rail 20 can be machined with a high accuracy since the machining operation of the teeth T2 of the toothed rail 20 is performed at a different timing from the machining operation of the parallel rail portion 26a and 26b and the lower end coupler portion 28 of the toothed rail 20. This is because of the fact that the vibrations caused by the respective machining operations performed in the foregoing process are by no means interact to those of other machining operations.

The operation of the production apparatus for producing the motion transforming machine will be described hereinlater.

Initially, a single lengthy machining material 20M of the toothed rail 20 is prepared to be machined into the toothed rail 20 with the teeth T2, the parallel rail portions 26a and 26b and the lower end coupler portion 28. The first, second and third machining units 70, 80 and 90 are then held to assume their respective inoperable positions where the first, second and third tools 71, 81 and 91 are held out of contact with the machining material 20M of the toothed rail 20. The machining material 20M of the toothed rail 20 is then connected at its longitudinal end portion with the connecting rod through the coupling and the screw member before the machining material 20M of the toothed rail 20 is transferred by the transferring mechanism to be supported by the supporting rollers 51a, 51b, 52a, 52b and 53a of the supporting means 50 from the left hand side to the right hand side in FIG. 6. The machining material 20M of the toothed rail 20 is thus positioned with respect to the first, second and third machining units 70, 80 and 90 to be ready for the teeth T2 to be machined. The first tool 71 of the first machining unit 70 is then moved together with the electric motor 73 to assume its operable position where the first tool 71 is held in contact with the machining material 20M of the toothed rail 20. The electric motor 73 for the first machining unit 70 is then driven for rotation to cause the machining material 20M of the toothed rail 20 to be machined by the first tool 71 of the first machining unit 70 which is moved in a direction perpendicular to the mid-longitudinal plane of machining material 20M of the toothed rail 20. After the machining operation of machining one addendum and dedendum forming a tooth T2 on the machining material 20M of the toothed rail 20, the first machining unit 70 is moved to assume its inoperable position and the machining material 20M of the toothed rail 20 is transferred one pitch by the transferring means 60 for a subsequent machining operation of machining adjacent addendum and dedendum forming an adjacent tooth T2. The first machining unit 70 is then moved to assume its operable position to machine the adjacent tooth T2. In this way, the machining operation is operated from one of the longitudinal ends to the other of the longitudinal ends of the machining material 20M of the toothed rail 20 by repeating machining one dedendum by one dedendum and one addendum by one addendum to produce the teeth T2 on the toothed rail 20. After the machining operation of machining the teeth T2 of the toothed rail 20 by the first machining unit 70 is finished, the first machining unit 70 is moved to assume its inoperable position where the first tool 71 is out of contact with the machining material 20M of the toothed rail 20 while the second and third machining units 70, 80 and 90 are in turn moved to their operable positions where the second and third tools 71, 81 and 91 are held in contact with the machining material 20M of the toothed rail 20. Under these conditions, the machining material 20M of the toothed rail 20 is transferred by the transferring means 60 at a predetermined speed to machine the parallel rail portions 26a and 26b and the lower end coupler portion 28 on the machining material 20M of the toothed rail 20 from one of the longitudinal ends to the other of the longitudinal ends. After the machining operations of machining the parallel rail portions 26a and 26b and the lower end coupler portion 28 of the toothed rail 20 by the second and third machining units 70, 80 and 90 are finished, the second and third machining units 70, 80 and 90 are moved to assume their inoperable position where the second and third tools 71, 81 and 91 are out of contact with the machining material 20M of the toothed rail 20 in a similar state to the first tool 71 which is held out of contact with the toothed rail 20.

While there has been described in the above embodiment about the fact that the machining operation of machining the teeth T2 of the toothed rail 20 is performed in advance of the machining operations of machining the parallel rail portions 26a and 26b and the lower end coupler portion 28 of the toothed rail 20, the machining operations of machining the parallel rail portions 26a and 2 6b and the lower end coupler portion 28 of the toothed rail 20 may be performed ahead of the machining operation of machining the teeth T2 of the toothed rail 20 according to the present invention. While, further, there has been described in the foregoing embodiment about the fact that the machining operation of machining the parallel rail portions 26a and 26b of the toothed rail 20 is performed simultaneously with the machining operation of machining the lower end coupler portion 28 of the toothed rail 20 in the above embodiment, it may of course be possible according to the present invention that the machining operation of machining the parallel rail portions 26a and 26b of the toothed rail 20 is performed at a different timing from the machining operation of machining the lower end coupler portion 28 of the toothed rail 20. The machined toothed rail 20 made from a single and integral machining material 20M has a small amount of errors as compared with the machined toothed rail 20 comprising separate portions made of a single or different machining materials.

Figure 12:
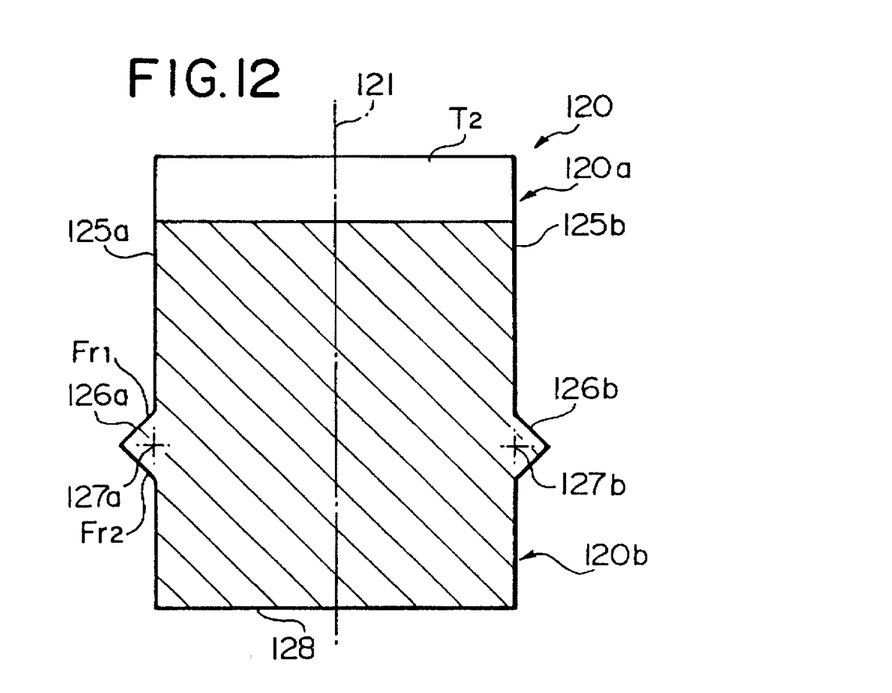
FIG. 12 is a cross-sectional view of a toothed rail forming part of the second embodiment of the motion transforming mechanism according to the present invention.
Figure 13A:
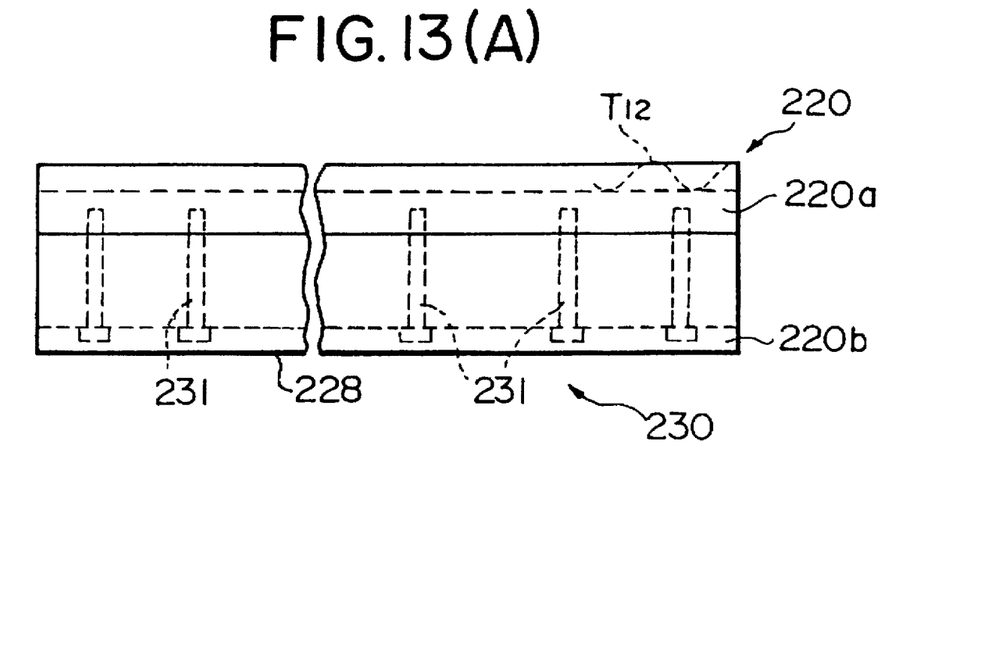
FIG. 13(A) is a fragmentary side view of another embodiment of the toothed rail forming part of the motion transforming mechanism according to the present invention.

According to the present invention, the teeth T2, the parallel rail portion 26a and 26b and the lower end coupler portion 28 of the toothed rail 20 can be machined by the first, second and third machining units 70, 80 and 90 while the machining material 20M of the toothed rail 20 is being supported on the supporting rollers 51a, 51b, 52a, 52b and 53a of the supporting means 50. The errors for positioning of the machining material 20M of the toothed rail 20 can be reduced to a minimum level, thereby resulting in producing the toothed rail 20 with a relatively high accuracy. The toothed rail 20 can be produced at one definite position where the supporting means 50 is positioned and thus is not required to be transferred to the other different and remote position for machining any one of the teeth T2, the parallel rail portion 26a and 26b and the lower end coupler portion 28 of the toothed rail 20. The toothed rail 20 can be produced at a low cost. The aforesaid production apparatus may be used to produce another toothed rail shown in FIG. 12 or 13.

Figure 11:
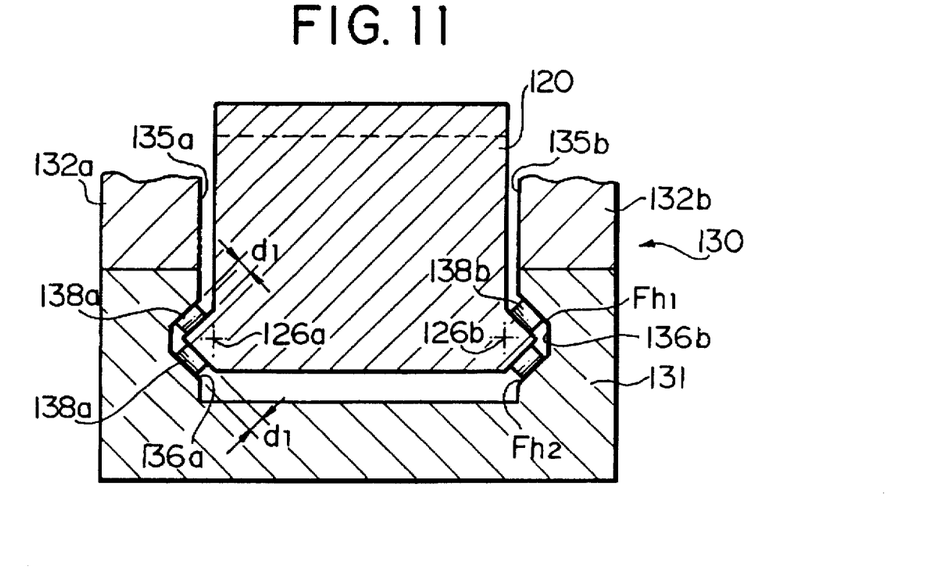
FIG. 11 is a fragmentary cross-sectional view of a second embodiment of the motion transforming mechanism and particularly showing the toothed rail and part of the housing accommodating the toothed rail.

Another embodiment of the motion transforming mechanism according to the present invention will now be described with reference to FIGS. 11 and 12.

The motion transforming mechanism comprises a toothed rail 120 and a housing 130. The toothed rail 120 has both side face portions 125a and 125b across the mid-longitudinal plane 121 of the toothed rail 120 and each formed with a parallel rail protrusion 126a or 126b having a center axis 127a or 127b extending in parallel with the mid-longitudinal plane 121 and the pitch plane 124 of the toothed rail 120. The housing 130 has base portion 131, both side wall portions 132a, 132b and both inner side face portions 135a and 135b in opposing and spaced relationship with the both side face portions 125a and 125b of the toothed rail 120. The housing 130 comprises a base portion 131 formed with parallel housing grooves 136a or 136b having center axes each in registry with the center axis 127a and 127b of the parallel rail protrusions 126a and 126b of the toothed rail 120. Each of the parallel housing grooves 136a and 136b is in opposing and spaced relationship with each of the parallel rail protrusions 126a and 126b with a parallel gap d1. The distance regulating means comprises a plurality of guide rollers 138a and 139b received in the parallel gap between the parallel rail protrusions 126a and 126b of the toothed rail 120 and the parallel housing grooves 136a and 136b of the housing 130 and movable between the closed longitudinal ends of the parallel housing groove 136a and 136 to ensure the toothed rail 120 and the housing 130 to relatively smoothly move with respect to each other.

The parallel rail protrusions 126a and 126b of the toothed rail 120 has a triangular shape in cross-section sectioned perpendicularly to the mid-longitudinal plane 121 and the pitch plane 24 of the teeth T2 and formed with two flat side planes Fr1 and Fr2 outwardly converging to each other. The parallel housing groove 136a and 136b of the housing 130 receives the parallel rail protrusions 126a and 126b of the toothed rail 120 and has two flat inner side faces Fh1 and Fh2 opposing to the two flat side planes Fr1 and Fr2 of the parallel rail protrusions 126a and 126b of the toothed rail 120. The guide rollers 138a and 138b are arranged between the flat side planes Fr1 and Fr2 of the parallel rail protrusions 126a and 126b of the toothed rail 120 and the flat inner side Fh1 and Fh2 faces of the parallel housing groove of the housing 130.

The parallel rail protrusions 126a and 126b of the toothed rail 120 has a triangular shape in cross-section sectioned perpendicularly to the mid-longitudinal plane 121 and the pitch plane 24 of the toothed rail 120 and formed by two planes converging to each other. The parallel housing groove of the housing 130 receives the parallel rail protrusions 126a and 126b of the toothed rail 120 with the parallel gap and has two inner side faces opposing to the two planes of the parallel rail protrusions 126a and 126b of the toothed rail 120. The rollers 138a and 138b are arranged between the two planes Fr1 and Fr2 of the parallel rail protrusions 126a and 126b of the toothed rail 120 and the two inner side faces Fh1 and Fh2 of the parallel housing groove 136a and 136b of the housing 130.

Another embodiment of the method of producing the motion transforming mechanism according to the present invention will now be described with reference to FIGS. 13 (A) and 13 (B).

Figure 13B:
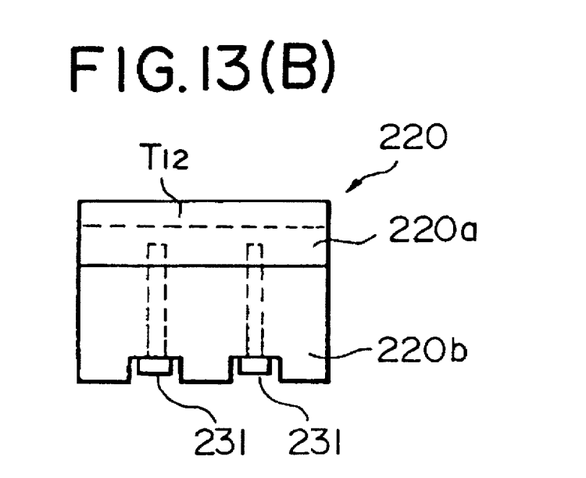
FIG. 13(B) is a front view of the toothed rail shown in FIG. 13(A)

The toothed rail 220 exemplified in this embodiment is shown in FIGS. 13 (A) and 13 (B) as comprising toothed portion 220a formed with the teeth T12 and a base portion 220b attached by fastening means 230 to support the toothed portion 220a of the toothed rail 220. The fastening means 230 is constituted by a plurality of bolts 231 longitudinally equally spaced apart from one another.

The method of producing the toothed rail of the motion transforming machine will be described hereinlater.

Initially, a material of the toothed portion 220a is attached by the fastening means 230 to the material of the toothed portion 220a of the toothed rail 220. The toothed portion 220a and the base portion 220b are fastened by the fastening means 230 to form a machining material 220M of the toothed rail 220. The material 220M of the toothed rail 220 is prepared to be machined into the toothed rail 220 with the teeth T2, the parallel rail portions 226a and 226b and the lower end coupler portion 28. The first, second and third machining units 70, 80 and 90 are then held to assume their respective inoperable positions where the first, second and third tools 71, 81 and 91 are held out of contact with the machining material 220M of the toothed rail 220. The machining material 220M of the toothed rail 220 is then connected at its longitudinal end portion with the connecting rod 61 through the coupling 63 and the screw member 62 before the machining material 220M of the toothed rail 220 is transferred by the transferring mechanism 60 to be supported by the supporting rollers 51a, 51b, 52a, 52b and 53a of the supporting means 50 from the left hand side to the right hand side in FIG. 10. The machining material 220M of the toothed rail 220 is thus positioned with respect to the first, second and third machining units 70, 80 and 90 to be ready for the teeth T2 to be machined. The first tool 71 of the first machining unit 70 is then moved together with the electric motor 73 to assume its operable position where the first tool 71 is held in contact with the machining material 220M of the toothed rail 220. The electric motor 73 for the first machining unit 70 is then driven for rotation to cause the machining material 220M of the toothed rail 220 to be machined by the first tool 71 of the first machining unit 70 which is moved in a direction perpendicular to the mid-longitudinal plane of machining material 220M of the toothed rail 220. After the machining operation of machining one addendum and dedendum forming a tooth on the machining material 220M of the toothed rail 220, the first machining unit 70 is moved to assume its inoperable position and the machining material 220M of the toothed rail 220 is transferred one pitch by the transferring means for a subsequent machining operation of machining adjacent addendum and dedendum forming an adjacent tooth. The first machining unit 70 is then moved to assume its operable position to machine the adjacent tooth. In this way, the machining operation is operated from one of the longitudinal ends to the other of the longitudinal ends of the machining material 220M of the toothed rail 220 by repeating machining one dedendum by one dedendum and one addendum by one addendum to produce the teeth T2 on the toothed rail 220. After the machining operation of machining the teeth T2 of the toothed rail 220 by the first machining unit 70 is finished, the first machining unit 70 is moved to assume its inoperable position where the first tool 71 is out of contact with the machining material 220M of the toothed rail 220 while the second and third machining units 70, 80 and 90 are in turn moved to their operable positions where the second and third tools 71, 81 and 91 are held in contact with the machining material 220M of the toothed rail 220. Under these conditions, the machining material 220M of the toothed rail 220 is transferred by the transferring means at a predetermined speed to machine the parallel rail portions and the lower end coupler portion on the machining material 220M of the toothed rail 220 from one of the longitudinal ends to the other of the longitudinal ends. After the machining operations of machining the parallel rail portions and the lower end coupler portion 228 of the toothed rail 220 by the second and third machining units 70, 80 and 90 are finished, the second and third machining units 70, 80 and 90 are moved to assume their inoperable position where the second and third tools 71, 81 and 91 are out of contact with the machining material 220M of the toothed rail 220 in a similar state to the first tool 71 which is held out of contact with the toothed rail 220.

While there has been described in the above embodiment about the fact that the machining operation of machining the teeth T2 of the toothed rail 220 is performed in advance of the machining operations of machining the parallel rail portions and the lower end coupler portion 228 of the toothed rail 220, the machining operations of machining the parallel rail portions and the lower end coupler portion 228 of the toothed rail 220 may be performed ahead of the machining operation of machining the teeth T2 of the toothed rail 220 according to the present invention. While, further, there has been described in the foregoing embodiment about the fact that the machining operation of machining the parallel rail portions of the toothed rail 220 is performed simultaneously with the machining operation of machining the lower end coupler portion 228 of the toothed rail 220 in the above embodiment, it may of course be possible according to the present invention that the machining operation of machining the parallel rail portions of the toothed rail 220 is performed at a different timing from the machining operation of machining the lower end coupler portion 228 of the toothed rail 220. The machined toothed rail 220 made from a single and integral machining material 220M has a small amount of errors as compared with the machined toothed rail 220 comprising separate portions made of a single or different machining materials.

According to the present invention, the teeth T2, the parallel rail portion and the lower end coupler portion 228 of the toothed rail 220 can be machined by the first, second and third machining units 70, 80 and 90 while the machining material 220M of the toothed rail 220 is being supported on the supporting rollers 51a, 51b, 52a, 52b and 53a of the supporting means 50. The errors for positioning of the machining material 220M can be reduced to a minimum level, thereby resulting in producing the toothed rail 220 with a relatively high accuracy. The toothed rail 220 can be produced at one definite position where the supporting means 50 is positioned and thus is not required to be transferred to the other different and remote position for machining any one of the teeth T2, the parallel rail portion and the lower end coupler portion 228 of the toothed rail 220. The toothed rail 220 can be produced at a low cost.

What is claimed:

1. A production apparatus for producing a guide rail having both side face portions formed with parallel rail portions, and a coupler portion to be coupled with a stationary member, said parallel rail portions having their respective center axes extending in parallel with each other, comprising:

supporting means for supporting a machining material to allow said machining material only to move in its longitudinal direction;

transferring means for transferring said machining material at a predetermined movement speed in said longitudinal direction of said machining material;

a pair of rail portion machining units respectively having tools for machining said parallel rail portions of said guide rail in parallel with each other while said machining material is being transferred by said transferring means under the state that said machining material is supported by said supporting means, each of said tools of said rail portion machining units being positioned to have said machining material cut at a predetermined depth; and a coupler portion machining unit having a tool for machining said coupler portion of said guide rail while said machining material is being transferred by said transferring means under the state that said machining material is supported by said supporting means, said coupler portion machining unit being positioned to have said machining material cut at a predetermined depth.

2. A production apparatus for producing a guide rail having a mid-longitudinal plane extending in its longitudinal direction, both side face portions across said mid-longitudinal plane and formed with parallel rail portions, a toothed portion formed with a plurality of teeth and having a pitch plane perpendicularly intersected by said mid-longitudinal plane, and a coupler portion to be coupled with a stationary member, said parallel rail portions having their respective center axes extending in parallel with said mid-longitudinal plane and said pitch plane, comprising:

supporting means having a plurality of supporting rollers for supporting a machining material to allow said machining material only to move in its longitudinal direction, said supporting rollers being positioned on each of the upper surface, lower surface and both side surfaces of said machining material to be held in contact with said machining material at first and second contact positions spaced apart from each other in said longitudinal direction of said machining material;

transferring means for transferring said machining material at a predetermined movement speed in said longitudinal direction and stopping said machining material at a predetermined time interval after said machining material is transferred at a predetermined movement pitch;

a first machining unit having a first tool for machining said teeth of said toothed portion during said predetermined time interval under the state that said machining material is supported only to move in said longitudinal direction by said supporting means and stopped by said transferring means;

a pair of second machining units respectively having second tools for machining said parallel rail portions of said guide rail in parallel with said mid-longitudinal plane and said pitch plane while said machining material is being transferred by said transferring means under the state that said machining material is supported by said supporting means, each of said second tools of said second machining units being positioned to have said machining material cut at a predetermined depth; and a third machining unit having a third tool for machining said coupler portion of said guide rail while said machining material is being transferred by said transferring means under the state that said machining material is supported by said supporting means, said third tool of said third machining unit being positioned to have said machining material cut at a predetermined depth.

3. A production apparatus as set forth in claim 2, in which said second tools of said second machining units are operable to cut said machining material to form a pair of parallel rail grooves on the both sides of said machining material.

4. A production apparatus as set forth in claim 2, in which said second tools of said second machining units are operable to cut said machining material to form a pair of parallel rail protrusions on the both sides of said machining material.

5. A production apparatus as set forth in claim 2, in which said first tool of said first machining unit is positioned on the upper side of said machining material, and in which said third tool of said third machining unit is positioned on the lower side of said machining material.

6. A production process of producing a guide rail having both side face portions formed with parallel rail portions, and a coupler portion to be coupled with a stationary member, said parallel rail portions having their respective center axes extending in parallel with each other, comprising the steps of:

supporting a machining material to allow said machining material only to move in its longitudinal direction;

transferring said machining material at a predetermined movement speed in its longitudinal direction;

machining said parallel rail portions of said guide rail in parallel with each other by cutting said machining material at a predetermined depth while said machining material is being transferred in said longitudinal direction under the state that said machining material is supported and allowed only to move in said longitudinal direction; and machining said coupler portion of said guide rail by cutting said machining material at a predetermined depth while said machining material is being transferred in said longitudinal direction under the state that said machining material is supported and allowed only to move in said longitudinal direction.

7. A production process of producing a guide rail having a mid-longitudinal plane extending in its longitudinal direction, both side face portions across said mid-longitudinal plane and formed with parallel rail portions, a toothed portion formed with a plurality of teeth and having a pitch plane perpendicularly intersected by said mid-longitudinal plane, and a coupler portion to be coupled with a stationary member, said parallel rail portions having their respective center axes extending in parallel with said mid-longitudinal plane and said pitch plane, comprising the steps of:

supporting a machining material to allow said machining material only to move in its longitudinal direction by guiding said machining material at first and second contact positions on each of the upper surface, lower surface and both side surfaces of said machining material, said first and second contact positions being spaced apart from each other in said longitudinal direction of said machining material;

transferring said machining material at a predetermined movement speed in said longitudinal direction;

stopping said machining material at a predetermined time interval after said machining material is transferred at a predetermined movement pitch;

machining part of said teeth of said toothed portion during said predetermined time interval under the state that said machining material is supported only to move in said longitudinal direction and stopped;

machining each of said parallel rail portions of said guide rail in parallel with said mid-longitudinal plane and said pitch plane by cutting said machining material at a predetermined depth while said machining material is being transferred in said longitudinal direction under the state that said machining material is supported only to move in said longitudinal direction; and machining said coupler portion of said guide rail by cutting said machining material at a predetermined depth while said machining material is being transferred in said longitudinal direction under the state that said machining material is supported only to move in said longitudinal direction.

8. A production process as set forth in claim 7, wherein said parallel rail portions are formed to have a pair of parallel rail grooves extend in parallel with each other on the both sides of said machining material.

9. A production process as set forth in claim 7, wherein said parallel rail portions are formed to have a pair of parallel rail protrusions extend in parallel with each other on the both sides of said machining material.

10. A production process as set forth in claim 7, wherein said toothed portion of said guide rail is formed on the upper side of said machining material, and wherein said coupler portion of said guide rail is formed on the lower side of said machining material.

* * * * *